United States Patent
Hosseini et al.

(10) Patent No.: US 12,555,291 B2
(45) Date of Patent: Feb. 17, 2026

(54) METHOD FOR AUTOMATED REGULARIZATION OF HYBRID K-SPACE COMBINATION USING A NOISE ADJUSTMENT SCAN

(71) Applicants: Siemens Healthineers AG, Forchheim (DE); The General Hospital Corporation, Boston, MA (US)

(72) Inventors: Zahra Hosseini, Atlanta, GA (US); Bryan Clifford, Malden, MA (US); Thorsten Feiweier, Poxdorf (DE); Stephan Kannengiesser, Wuppertal (DE); Marcel Dominik Nickel, Herzogenaurach (DE); Stephen Farman Cauley, Somerville, MA (US)

(73) Assignees: Siemens Healthineers AG, Forchheim (DE); The General Hospital Corporation, Boston, MA (US)

( * ) Notice: Subject to any disclaimer, the term of this patent is extended or adjusted under 35 U.S.C. 154(b) by 549 days.

(21) Appl. No.: 17/655,013

(22) Filed: Mar. 16, 2022

(65) Prior Publication Data
US 2022/0343564 A1 Oct. 27, 2022

Related U.S. Application Data

(60) Provisional application No. 63/180,128, filed on Apr. 27, 2021.

(51) Int. Cl.
G06T 11/00 (2006.01)
A61B 5/00 (2006.01)
A61B 5/055 (2006.01)

(52) U.S. Cl.
CPC ............ G06T 11/005 (2013.01); A61B 5/055 (2013.01); A61B 5/7264 (2013.01);
(Continued)

(58) Field of Classification Search
CPC ........ G06T 2207/10088; G06T 11/005; G06T 5/50; G06T 5/00; G06T 5/92;
(Continued)

(56) References Cited

U.S. PATENT DOCUMENTS

| 8,135,452 | B2 * | 3/2012 | Dougherty | A61B 5/055 |
| | | | | 600/407 |
| 2011/0254548 | A1 * | 10/2011 | Setsompop | G01R 33/4835 |
| | | | | 324/309 |

(Continued)

FOREIGN PATENT DOCUMENTS

EP 3916417 A1 * 12/2021 ............. G06N 3/045

OTHER PUBLICATIONS

Bryan Clifford et al., "Clinical evaluation of an AI-accelerated two-minute multi-shot EPI protocol for comprehensive high-quality brain imaging," ISMRM, 2020, pp. 1-3. (Year: 2020) (Year: 2020).*

(Continued)

*Primary Examiner* — Gandhi Thirugnanam

(57) ABSTRACT

The present disclosure is generally directed to systems and methods for generating de-noised MR images that are reconstructed from a hybridization of two separate image reconstruction pipelines, at least one of which includes the use of a neural network. Further, the amount of influence that the neural network reconstruction has on the hybrid reconstructed image is controlled via a regularization parameter that is selected based on an estimated noise level associated with the initial image acquisition, which can be calculated from pre-scan data.

22 Claims, 6 Drawing Sheets

(52) U.S. Cl.
CPC . *A61B 2576/00* (2013.01); *G06T 2207/10088* (2013.01); *G06T 2207/20084* (2013.01)

(58) Field of Classification Search
CPC ........... G06T 2207/20081; G06T 2207/20084; G01R 33/5608; G01R 33/5611; G01R 33/4818; G01R 29/26; A61B 2576/00; A61B 5/055; A61B 5/7264; A61B 5/7267; A61B 5/7203; G06N 3/02–126; G06N 20/00–20; G06V 10/70; G06V 10/82; G06V 10/774–7796; G06F 18/214–2155; G06F 7/023; G06F 40/16
See application file for complete search history.

(56) References Cited

U.S. PATENT DOCUMENTS

| | | | | |
|---|---|---|---|---|
| 2013/0039553 | A1* | 2/2013 | Kjolby | G01R 33/56366 382/128 |
| 2016/0018498 | A1* | 1/2016 | Boernert | G01R 33/34092 324/309 |
| 2016/0225169 | A1* | 8/2016 | Bippus | G06T 11/005 |
| 2020/0041592 | A1* | 2/2020 | Huang | G01R 33/5619 |
| 2020/0300947 | A1* | 9/2020 | Wang | G01R 33/4818 |
| 2020/0305756 | A1* | 10/2020 | Wheaton | A61B 5/7203 |
| 2021/0035338 | A1* | 2/2021 | Zhou | G06N 20/20 |
| 2021/0192808 | A1* | 6/2021 | Chen | G06N 3/0985 |
| 2023/0194639 | A1* | 6/2023 | Feiweier | G01R 33/583 324/350 |

OTHER PUBLICATIONS

Matti Hanhela et al., "Data-Driven Regularization Parameter Selection in Dynamic MRI", Journal of Imaging. 2021; 7(2):38. https://doi.org/10.3390/jimaging7020038 (Year: 2021) (Year: 2021).*

Aggarwal, Hemant K., Merry P. Mani, and Mathews Jacob. "MoDL: Model-based deep learning architecture for inverse problems." IEEE transactions on medical imaging 38.2 (2018): 394-405. (Year: 2019).*

Lin, D. J., et al., "Artificial Intelligence for MR Image Reconstruction: An Overview for Clinicians." Journal of Magnetic Resonance Imaging, 2020, jmri.27078.

Chaudhari, A. S., et a., "Prospective Deployment of Deep Learning in MRI☐: A Framework for Important Considerations, Challenges, and Recommendations for Best Practices." Journal of Magnetic Resonance Imaging, Aug. 24, 2020, jmri.27331.

Knoll, F., et al., "Deep Learning Methods for Parallel Magnetic Resonance Image Reconstruction." ArXiv:1904.01112 [Cs, Eess], Apr. 1, 2019.

Blu, T., and Luisier, F., "The SURE-LET approach to image denoising." IEEE Transactions on Image Processing 16.11, 2778-2786, (2007).

Kannengiesser, S. A. R, et al. "Universal iterative denoising of complex-valued volumetric MR image data using supplementary information." ISMRM Abstract. vol. 2016. 1779.

Knoll, F. et al., "Assessment of the Generalization of Learned Image Reconstruction and the Potential for Transfer Learning." Magnetic Resonance in Medicine 81, 1: 116-28, (2019).

Hammernik, K., et al. "Σ-Net: Systematic Evaluation of Iterative Deep Neural Networks for Fast Parallel MR Image Reconstruction." ArXiv:1912.09278 [Cs, Eess], Dec. 18, 2019.

Recht, M., et al., "Using Deep Learning to Accelerate Knee MRI at 3T: Results of an Interchangeability Study", American Journal of Radiology., doi:10.2214/AJR.20.23313 (2020).

He, J., et al.: "Modulating Image Restoration with Continual Levels via Adaptive Feature Modification Layers", Proceedings of the IEEE/CVF Conference on Computer Vision and Pattern Recognition, (2019).

Kellman P., McVeigh E.R., "Image reconstruction in SNR units: a general method for SNR measurement," Magnetic Resonance in Medicine 54(6):1439-47, (2005).

Pruessmann, K.P., et al., "SENSE: Sensitivity Encoding for Fast MRI." Magnetic Resonance in Medicine 42: 952-62, (1999).

Clifford, B., et al., "Clinical evaluation of an AI-accelerated two-minute multi-shot EPI protocol for comprehensive high-quality brain imaging," ISMRM, 2021, pp. 1131.

Hyun, C. M., et al., "Deep learning for undersampled MRI reconstruction," Phys. Med. Biol. 63, 135007 (2018).

U.S. Appl. No. 17/178,674, filed Feb. 18, 2021.

* cited by examiner

METHOD FOR AUTOMATED REGULARIZATION OF HYBRID K-SPACE COMBINATION USING A NOISE ADJUSTMENT SCAN

PRIORITY

The present application claims priority to U.S. Provisional Patent Application No. 63/180,128, titled Method for Automated Regularization of Hybrid K-Space Combination Using a Noise Adjustment Scan, filed Apr. 27, 2021, which is hereby incorporated by reference herein in its entirety.

STATEMENT REGARDING FEDERALLY SPONSORED RESEARCH

This invention was made with Government support under grant numbers 1R01EB020613-01A1, 1U01HD087211-01, 5P41EB015896-18, 2R01EB006847-09A1 awarded by the National Institutes of Health. The Government has certain rights in the invention.

BACKGROUND

Deep neural networks have been applied in the recent years for many applications in magnetic resonance (MR) imaging, including end-to-end reconstruction, denoising/de-aliasing, and super-resolution. Whereas traditional regularized image reconstruction approaches such as compressed sensing utilize hand-crafted image priors based on various assumptions, deep learning (DL)-based approaches learn complex image priors through a training process wherein the parameters of a neural network are optimized over a large dataset. The use of more complex priors (realized as a trained neural network) allows DL methods to provide superior image quality compared to the older, more traditional methods; however, because the learned image priors can no longer be guaranteed to apply to all expected imaging conditions (e.g., noise-levels, undersampling levels, field inhomogeneities, etc.) and subjects (e.g., variations in anatomies, pathologies, etc.), it becomes important to verify the generalizability of the DL model to data not seen during training.

Deep learning models are commonly trained through supervised learning approaches, using a training dataset, consisting of pairs of corrupted (e.g. with noise or artifacts such as aliasing) and the corresponding uncorrupted "target" data, to learn the best mapping between the corrupted data and the target data (where "best" means a set of parameters learned during training, which result in the lowest average loss over the training dataset, and where loss is a predetermined, or a learned image quality metric). This process may lead to "overfitting," i.e., the model may learn priors that are only suitable for the range of conditions represented in the training data. While the model may lead to good results when applied to data obtained under the training conditions, it may fail to generalize, producing poor results (e.g., overly smooth or aliased images) when used on data from conditions not represented in the training dataset (e.g., pathologies or different noise levels/ratios).

Generalization of a DL model is often ensured by training using representative data from as many different imaging conditions as possible. In denoising applications, the adaptability of the trained model to varying levels of noise is crucial; however, creating a representative set of data for training is not trivial, since the noise statistics are dependent on many of the imaging conditions, such as the specific multi-channel coil used (including coil geometry and number of channels), the way the coil is loaded, as well as the specific parameters used to acquire the data (e.g., readout bandwidth, and the timing of RF and gradient pulses). The application of a single trained network to these different acquisition scenarios can result in over-smoothing (if the noise level is lower than that seen during training) or poor denoising (if the noise level is higher than that seen during training). One could train multiple networks to handle the expected range of varying noise levels in different acquisition scenarios, but this would come at the cost of increased training time (and thus increased usage of computing resources) as well as increased overhead for maintaining numerous networks.

Traditional reconstruction approaches (e.g., compressed sensing) have regularization parameters that can be tuned (possibly automatically) to enable generalization of the reconstruction to varying levels of noise. In most current DL-based reconstruction methods; however, such parameters are not provided and, in cases where a similar approach is followed, the nonlinearity of the reconstruction approach makes it difficult to know how to best adapt the parameter to different noise levels.

It is widely known that the difficulty of selecting or learning appropriate loss functions can lead to the tendency of DL-based denoising models produce overly smooth results, even in the absence of generalization problems. To address this issue, the addition of noise to the network output (a process referred to as "dithering") has been exploited in order to restore the appearance of image sharpness. The challenge in re-introducing noise into the DL-based reconstructed images is to formulate a realistic noise level that does not obscure the clinically relevant information in any parts of the imaging volume.

One way to avoid the poor generalization problem is to train the DL model with a sufficiently large training dataset that fully represents all possible imaging conditions; however, this approach can be impractical and/or costly. Even if it is possible to determine the full range of imaging conditions under which the model may be used, it will likely be very costly to acquire, store, and/or train over data from all conditions. In denoising applications, it is often possible to vary certain conditions (such as the noise level) across the entire expected range; however, it is often very challenging to train a single model to be capable of providing adequate performance under such widely varying conditions. Even if a network architecture with sufficient model capacity is devised to provide the desired performance across all conditions, the training would likely require significantly more computational resources, since training stability typically decreases with increased model capacity.

The problems due to poor model generalization could be avoided by training separate networks to handle different imaging conditions. In denoising applications, separate networks can each be trained with a different noise level used during training. The natural disadvantage of this approach is the overhead involved in training and maintaining these networks.

Therefore, there is a need in the MR imaging (MRI) technical field for techniques for producing generalized, DL-based image reconstruction techniques for de-noising of acquired images that solve all of the problems with the conventional techniques that are described above.

SUMMARY

Described herein are systems and methods for generating de-noised MR images. The techniques described herein generally utilize a data-driven approach to determine an optimal level of mixing between a DL-reconstructed image and acquired image data. This avoids the need for having representative data exhibiting a broad variety of noise levels (which can include varying signal and noise ratios) in the training dataset and, further, allows for a model trained under one set of noise conditions to be applied to many other noise conditions without retraining or increasing the size of the training dataset. In some embodiments, the systems and methods described herein dynamically extract scan-specific noise information and use it to objectively determine the extent to which the DL model output should contribute to the final, hybridized reconstructed image. As the contribution of the DL model output reduces, the contribution of the measured data (and measured noise) increases, thereby leading to a more natural looking and sharper final image, without the need to add additional noise.

In one aspect, the present disclosure is directed to a computer-implemented method for improving images captured via magnetic resonance imaging (MRI). This method includes steps by a computer system of receiving MRI data (including image data) from an MRI machine, calculating a noise level associated with the MRI data, and selecting a regularization parameter corresponding to the calculated noise level. The method further includes processing the image data through a first reconstruction pipeline to output a first reconstructed image, processing the image data through a second reconstruction pipeline to output a second reconstructed image, and reconstructing a hybrid image the first reconstructed image and the second reconstructed image. The second reconstruction pipeline includes a neural network. An amount that the second reconstructed image contributes to the hybrid image corresponds to the selected regularization parameter. Further, the regularization parameter is selected to cause the hybrid image to be de-noised relative to the received image data.

In some embodiments of this method, the first reconstruction pipeline comprises a sensitivity encoded (SENSE) reconstruction. In some embodiments, selecting the regularization parameter includes querying, by the computer system, a database comprising a plurality of regularization parameters indexed to a plurality of noise levels and selecting, by the computer system, the regularization parameter from the plurality of regularization parameters that corresponds to the calculated noise level. In some embodiments, the method includes calculating the regularization parameter from a fitted parametric model relating the calculated noise level to the regularization parameter. In some embodiments, selecting the regularization parameter is subject to user-customized preferences.

In some embodiments, the neural network includes a deep neural network or a physics informed network. In some embodiments, the MRI data includes pre-scan data acquired without any generated MR signals and the noise level is calculated from the pre-scan data. In some embodiments, the noise level is a signal-to-noise ratio.

In some embodiments, wherein reconstructing the hybrid image includes calculating, by the computer system, the hybrid image according to:

$$\hat{\rho} = \underset{\rho}{\operatorname{argmin}} \|d - \Omega FC\rho\|_2^2 + \lambda \|WFC(\rho_{net} - \rho)\|_2^2$$

wherein $\hat{\rho}$ is the hybrid image, d is a measured k-space data vector, $\Omega$ is a k-space sampling, F is a Fourier transform, C is a coil sensitivity corresponding to the MRI machine, W is a weighting matrix, $\rho_{net}$ is the second reconstructed image, $\rho$ is the image data, and $\lambda$ is the selected regularization parameter. In some embodiments, the selected regularization parameter is varied spatially in the hybrid image.

In another aspect, the present disclosure is directed to a magnetic resonance imaging (MRI) system for capturing images that includes an MRI machine and a computer system coupled to the MRI machine. The computer includes a processor and memory storing instructions that, when executed by the processor, cause the computer system to implement the methods described above.

FIGURES

The accompanying drawings, which are incorporated in and form a part of the specification, illustrate the embodiments of the invention and together with the written description serve to explain the principles, characteristics, and features of the invention. In the drawings.

DESCRIPTION

This disclosure is not limited to the particular systems, devices and methods described, as these may vary. The terminology used in the description is for the purpose of describing the particular versions or embodiments only, and is not intended to limit the scope.

As used herein, the terms "algorithm," "system," "module," or "engine," if used herein, are not intended to be limiting of any particular implementation for accomplishing and/or performing the actions, steps, processes, etc., attributable to and/or performed thereby. An algorithm, system, module, and/or engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, and/or engine may be equally performed by multiple algorithms, systems, modules, and/or engines, incorporated into and/or combined with the functionality of another algorithm, system, module, and/or engine of the same or different type, or distributed across one or more algorithms, systems, modules, and/or engines of various configurations.

As used herein, the terms "MM sequence," "pulse sequence," or "MM pulse sequence" are interchangeable and can include a particular combination of pulse sequences and/or pulsed field gradients that result in a particular set of MRI data. An MRI sequence can be used either individually or in combination with one or more other MRI sequences (i.e., multi-parametric MRI).

As used herein, the term "MRI data" can include an MRI image or any other data obtained via MRI (e.g., biomarker data or a parameter map). An MRI image can include a three-dimensional image or a two-dimensional image (e.g., a slice of a three-dimensional image).

Figure 1:
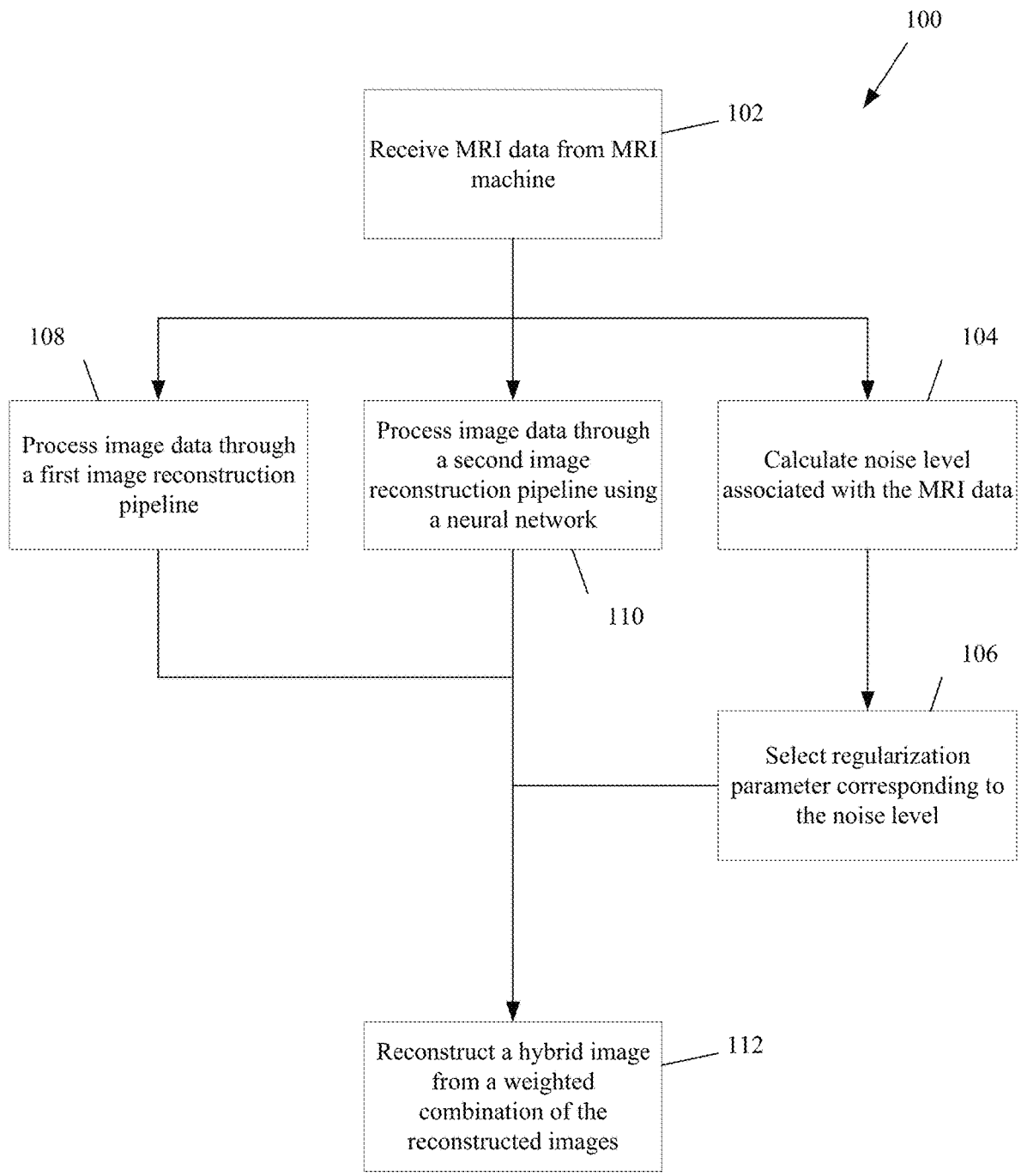
FIG. 1 is a flow diagram of a process for de-noising MR image data, in accordance with at least one aspect of the present disclosure.

Automated Regularization of Hybrid k-Space Combination Using a Noise Adjustment Scan The present disclosure is generally directed to systems and methods for generating de-noised MR images that are reconstructed from a hybridization of two separate image reconstruction pipelines, at least one of which includes the use of a neural network. Further, the amount of influence that the neural network reconstruction has on the hybrid reconstructed image is controlled via a regularization parameter that is selected based on an estimated noise level associated with the initial image acquisition, which can be calculated from pre-scan data. One example of such a process 100 is shown in FIG. 1. The process 100 can be implemented by medical imaging systems, such as the medical imaging system 800 illustrated in FIGS. 5A and 5B and described in detail below. The process 100 can be implemented in hardware, software, firmware, or any combination thereof. In one embodiment, the process 100 and/or particular steps thereof may be implemented as instructions stored in a memory (e.g., main memory 804) that, when executed by a processor (e.g., processor 802), cause a computer system (e.g., computer system 801) to perform the described steps. Further, the computer system executing the process 100 can be associated with a medical imaging system 800 or otherwise coupled to an MRI machine 830.

Accordingly, a computer system executing the process 100 can receive (step 102) MRI data from the MRI machine 830. The received MRI data can include the image data, i.e., the data captured during an imaging scan executed by the MRI machine 830. In one embodiment, the received MRI data can further include pre-scan data acquired by the receive coils (e.g., one or more of the RF coils 854) in the absence of any generated MR signals, and those noise-only MRI data can be referred to as a noise adjustment scan (i.e., an initial scan performed prior to the imaging scan).

Accordingly, the computer system can calculate (step 104) a noise level associated with the MRI data. In one embodiment, the noise level can be calculated (step 104) from the pre-scan data (i.e., the data acquired via the noise adjustment scan) included in the received MRI data. In one embodiment, the noise level can include the signal-to-noise ratio (SNR) based on the received pre-scan data (e.g., noise is calculated from the pre-scan data while signal is estimated based on the initial reconstructed image). In another embodiment, a representative noise level could be extracted from the data sampled during the imaging scan at a time point where no coherent MR signal is present (e.g., just prior to an excitation RF pulse and/or after the acquisition period of an MR signal where the remaining signal is dephased by applying "crusher" gradients). In this embodiment, the noise level in the image data can be calculated (step 104) by accounting for the effect of the image reconstruction steps. Based on the calculated noise level, the computer system can select (step 106) a regularization parameter that corresponds thereto, which can also be based on the estimated signal level. As described in greater detail below, the regularization parameter controls the relative influence or weight of the network-reconstructed image (i.e., the second reconstructed image) on the final de-noised, hybrid image output by the computer system.

Accordingly, the computer system can process (steps 108, 110) the received image data through a first image reconstruction pipeline and a second image reconstruction pipeline to generate a first reconstructed image and a second reconstructed image, respectively. In one embodiment, the first image reconstruction pipeline could include a SENSE reconstruction. The second image reconstruction pipeline can utilize a neural network (e.g., a deep neural network). In one embodiment, the neural network could include a physics-informed neural network, which is described in Hammernik et al. (2021), Systematic evaluation of iterative deep neural networks for fast parallel MRI reconstruction with sensitivity-weighted coil combination, *Magnetic Resonance in Medicine*, 86(4), 1859-1872, which is hereby incorporated by reference herein in its entirety.

After obtaining the initial reconstructed images, the computer system can reconstruct 112 a hybrid image from a weighted combination of the first and second reconstructed images. Further, the selected regularization parameter described above controls the degree to which the network-reconstructed image contributes to the hybrid image. In one embodiment, the reconstruction of the hybrid image can be calculated according to the following equation:

$$\hat{\rho} = \underset{\rho}{\operatorname{argmin}} \|d - \Omega FC\rho\|_2^2 + \lambda \|WFC(\rho_{net} - \rho)\|_2^2$$

wherein $\hat{\rho}$ is the hybrid image, d is a measured k-space data vector, $\Omega$ is a k-space sampling, F is a Fourier transform, C is a coil sensitivity corresponding to the MRI machine, W is a weighting matrix, $\rho_{net}$ is the second reconstructed image, $\rho$ is the image data, and $\lambda$ is the selected regularization parameter. As can be seen from the equation, the regularization parameter ($\lambda$) controls the relative influence of the network-reconstructed image ($\rho_{net}$) on the hybrid image ($\hat{\rho}$). The regularization parameter ($\lambda$) could be, for example, a value from 0 to 2.0. In some embodiments, regularization parameter ($\lambda$) can vary spatially in the hybrid image to reflect a spatially varying noise level. This can be calculated for the pre-scan data and additional data about the image reconstruction system, including data-dependent quantities like the "g-factor."

Figure 3A:
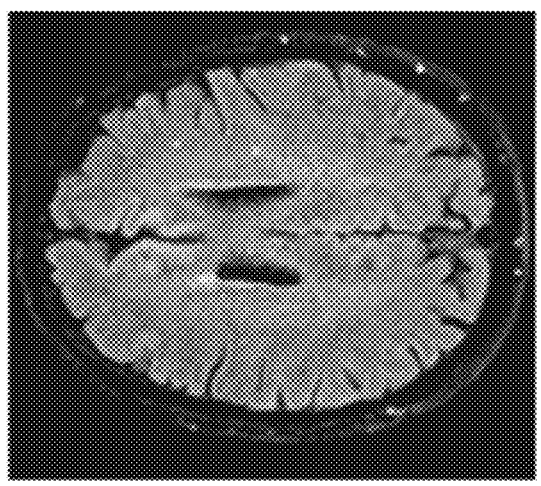
FIG. 3A is an MR image reconstructed using conventional reconstruction techniques.
Figure 3B:
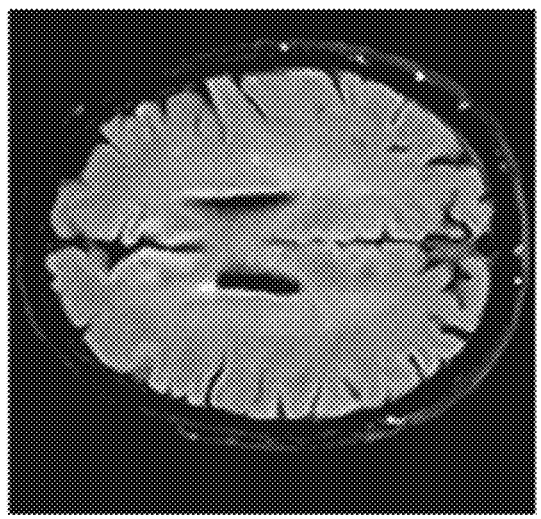
FIG. 3B is an MR image reconstructed using the process shown in FIG. 1 using an optimal regularization parameter, in accordance with at least one aspect of the present disclosure.
Figure 3C:
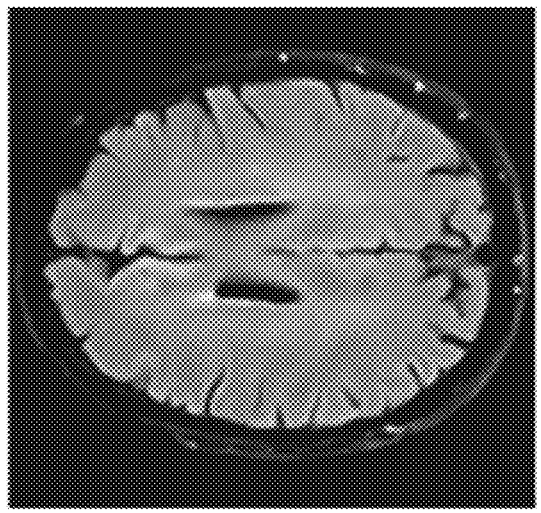
FIG. 3C is an MR image reconstructed using the process shown in FIG. 1 using a suboptimal regularization parameter, in accordance with at least one aspect of the present disclosure.

The weighted combination of the images reconstructed via the two pipelines results in a de-noised hybrid image because the relationship between the noise level and the regularization parameter has been pre-characterized in order to control the influence of the network-reconstructed image on the hybrid image to optimally de-noise the initially generated image. For example, lower weightings of the regularization parameter ($\lambda$) can decrease the influence of the network output on the reconstruction and lead to noisier, but also sharper and more natural looking images. Conversely, higher weightings can increase the influence of the network output and lead to smoother, but less noisy images. In order to illustrate the concepts described herein, a comparison between various reconstructed MR images is shown in FIG. 3A-3C. In particular, FIG. 3A shows an MR image reconstructed solely using a conventional SENSE reconstruction, i.e., not using the hybrid reconstruction techniques described herein. Conversely, FIG. 3B shows an MR image reconstructed using the hybrid reconstruction techniques described herein using an optimal regularization parameter. As can be seen, the MR image in FIG. 3B lacks much of the noise or other imaging artifacts present in the MR image shown in FIG. 3A, while still retaining the proper overall appearance of the imaged structure. However, selecting the regularization parameter properly can be important to producing optimal quality images because using a suboptimal regularization parameter can cause the network-reconstructed image to have too little or too much influence on the hybrid image reconstruction. For example, FIG. 3C shows an MR image where the regularization parameter is too high, resulting in an overly smooth reconstruction of the imaged structure. Therefore, it is important for the regularization parameter to be properly selected for the calculated noise level for the MRI data.

An optimal regularization parameter can be arrived at by characterizing the degree of noise present in the measured MRI data. The degree of noise used in this step can be one or more noise features, including absolute noise level, signal level, sequence type/Bloch simulation bases, or relative noise level (e.g., noise/signal or SNR). Collectively, absolute and relative noise level (such as SNR) can be referred to as a noise level, which can include data identifying noise values or ratios. For example, when the ratio of the noise level to the signal level is high relative to the ratio used during the training of the neural network, the final reconstruction needs to rely more on the output of the neural network in order to reduce the amount of noise amplification and, hence, requires a larger weighting. In some embodiments, noise ratios in the measured MRI data can be identified using the signal equation and/or Bloch simulations. In other embodiments, noise ratios can be derived directly from the MRI data. In this embodiment, the computer system can perform a dynamic and scan-specific noise measurement that reflects the protocol parameter selection (e.g., echo time and relaxation time), as well as the imaging setup (e.g., the specific multi-channel coil and coil loading). The advantage of a data-driven noise measurement approach is that it will result in a robust and adaptable regularization of the hybrid reconstruction. An example of propagation of noise from acquired (k-space) data samples into images is described in Kellman and McVeigh. Magn Reson Med. 2005 December, "Image reconstruction in SNR units: a general method for SNR measurement."

In conventional MRI systems, regularization parameters for image processing are often manually defined by the user. However, such manual techniques have significant downsides because it relies on substantial amounts of trial and error, is susceptible to human error, and is not dynamic and automated at run-time. Accordingly, the techniques described herein wherein the regularization parameter is automatically selected by the computer system based on the individualized, dynamic characteristics of the medical imaging system provides significant benefits over such conventional MR image processing techniques. In some embodiments, the selection of the regularization parameter can be influenced by user preferences. For example an experienced technician can set preferences to tune the regularization process, causing the regularization parameter to be calculated higher or lower than it might otherwise be, but still selected using the automatic selection processes described herein.

Figure 4:
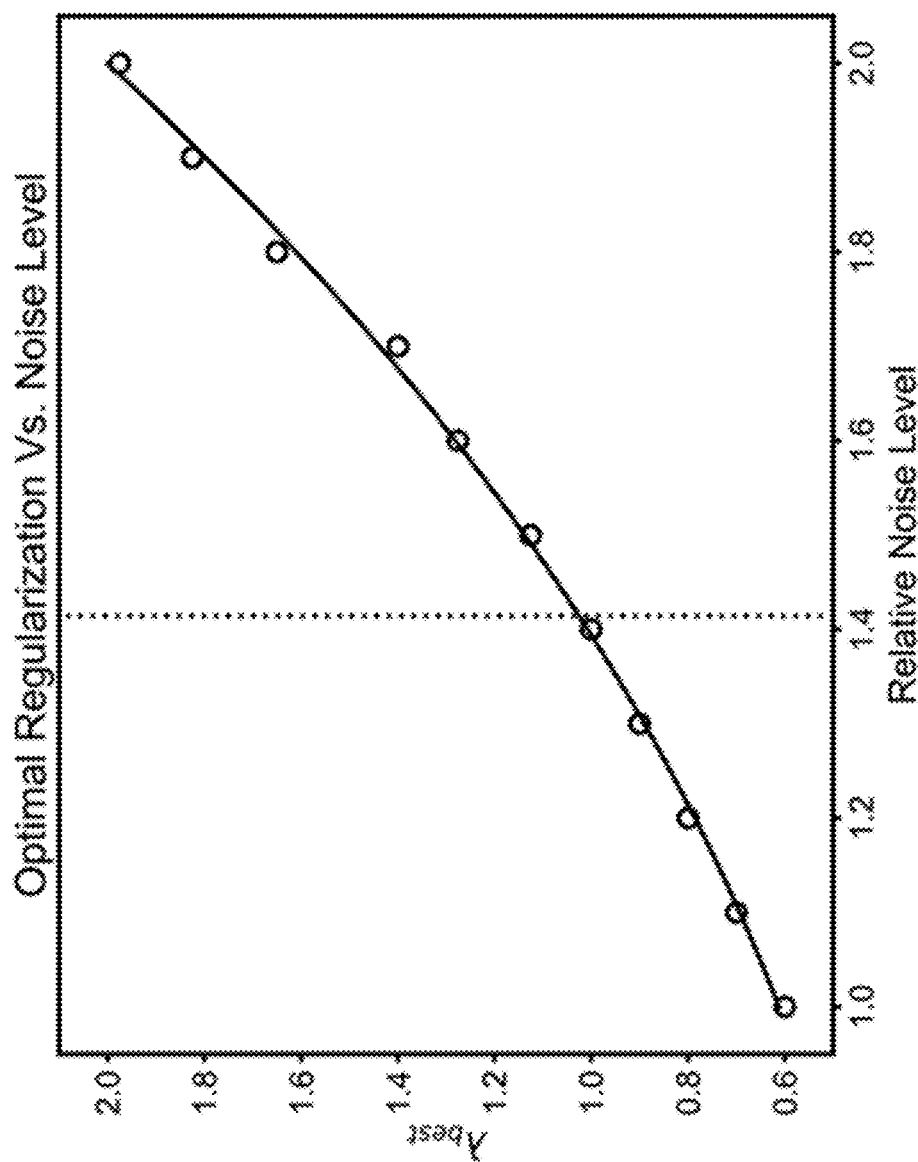
FIG. 4 is a graph illustrating a parametric relationship between noise level and the optimal regularization parameter, in accordance with at least one aspect of the present disclosure.

In one embodiment, the relationship between the regularization parameter and the noise level measurement (e.g., SNR) can be modeled by (i) determining the regularization parameter value that results in the best image quality (e.g., the best balance between image SNR and sharpness/naturalness) for a range of noise level values and (ii) fitting the determined "best" regularization parameter values with a suitable parametric model (e.g., a polynomial or spline) that is a function of the noise statistics and the regularization parameter values. One illustrative example of such a parametric model is illustrated by the graph shown in FIG. 4. In the particular example shown in FIG. 4, a $3^{rd}$ order polynomial is used to fit the optimal regularization parameter to the noise level measurements. Further, the parametric model parameters can then be stored and used for future imaging scenarios (since this relationship remains stable). During execution, the computer system can calculate the noise level associated with the MRI data for a given MRI scan and then map the calculated noise level to an appropriate regularization parameter to be used in reconstructing that data for producing an optimal quality (i.e., de-noised) MR image. In another embodiment, the computer system could store a database of noise levels that are indexed to corresponding pre-characterized regularization parameter values. In this embodiment, interstitial data could be interpolated from the pre-characterized data. In yet another embodiment, the computer system could execute a dynamic optimization algorithm that depends on the estimated noise level or SNR (e.g., the SURE estimate).

A variety of methods could be used to determine the best values for the regularization parameter for particular noise levels. For example, a radiologist could be asked to select the values manually for each noise level. As another example, an image quality metric could be calculated, and the value of the regularization parameter could be chosen in a way to maximize the quality as indicated by the metric. Regardless of the specific technique used for associating the best or preferred vales for the regularization parameter for given noise levels, any of the techniques described above could be implemented in the computer system for selecting the regularization parameter for a given calculated noise level during execution of the process 100.

In alternative embodiments of the process 100, in addition to or in lieu of calculating (step 104) a noise level associated with the MRI data, the computer system can characterize the MRI data using a thresholding approach performed on the first image reconstruction estimate (e.g., the 95th percentile) or a segmentation approach (e.g., via k-means clustering) to identify regions of foreground/tissue in an imaging slice. The computer system could correspondingly compute noise statistics (e.g., standard deviation) for these regions. In particular, the first reconstruction estimate and the derived noise standard deviation could be used to calculate the noise level (e.g., SNR) associated with the received MRI data. These techniques can be beneficial because the noise standard deviation allows for the computer system to account for key acquisition parameters that can impact the noise statistics (e.g., receiver bandwidth or the specific multi-channel coil including its load). Implementing such alternative techniques for determining the noise level statistics could further generalize the process 100 illustrated in FIG. 1 to varying contrasts (e.g., caused due to changes to echo time, relaxation time, and RF pulse amplitudes). In some embodiments, noise levels can be estimated based on a scan without an MR signal; estimation of the signal level can be based on the first reconstruction estimate, giving a SNR or relative noise level.

Figure 2:
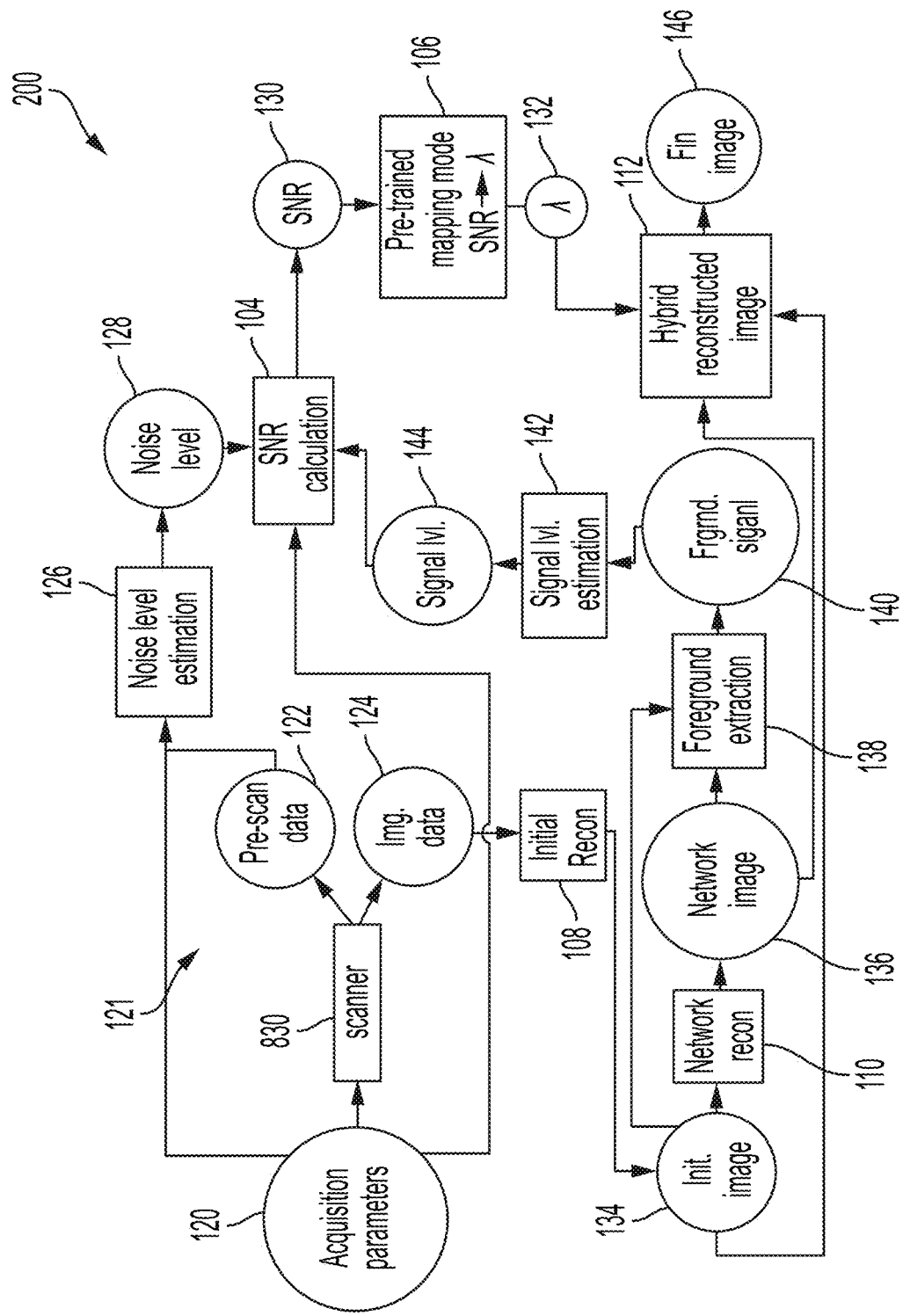
FIG. 2 is a flow diagram of an illustrative implementation of the process shown in FIG. 1, in accordance with at least one aspect of the present disclosure.

To further illustrate the concepts described herein, FIG. 2 shows a flow diagram of an illustrative implementation of the process 100 shown in FIG. 1. In the illustrated process 200, the initial acquisition parameters 120 for the MRI machine 830 (i.e., scanner) can be set and MRI data 121 can be obtained (which, in turn, can be received 102 by the computer system). The MRI data 121 can include pre-scan data 122 (i.e., the data obtained via a noise adjustment scan) and image data 124 (i.e., the data obtained via the imaging scan).

The computer system can perform an initial noise level estimation 126 to obtain an estimated noise level measurement 128. Further, the computer system can calculate (step 104) a noise level measurement 130 based on the estimated noise level measurement 128 and the acquisition parameters 120. In this particular implementation, the noise level measurement is SNR; however, other noise level measurements could be used in other embodiments. Correspondingly, the computer system selects 106 a regularization parameter 132 based on a pre-trained mapping model relating the noise level measurement (e.g., SNR) to the regularization parameter values.

Further, the computer system processes (step 108) the image data 124 through a first image reconstruction pipeline (e.g., implementing a SENSE reconstruction) to obtain a first reconstructed image (i.e., an initial image 134). In some embodiments, the computer system further processes 110 the image data (embodied as the initial image 134) through a second image reconstruction pipeline using a neural network to obtain a second reconstructed image (i.e., a network-reconstructed image 136). The computer system can then extract the foreground (corresponding to p in the equation above), which can correspond to the initial image 134 described above. In this particular embodiment, the computer system can further calculate the foreground signal 140 and perform a signal level estimation 142 thereon to obtain an estimated signal level 144. The estimated signal level 144 can further be used in calculating 104 the noise level, as described above. Finally, the computer system can reconstruct (step 112) a hybrid image 146 (i.e., the final or output image) from a weighted combination of the initial image 134 and the network image 136 based on the selected regularization parameter 132. In some embodiments, this can include separate tasks of generating hybrid data by a weighted combination of the initial image and of the network image and generating a final image from the hybrid data. Accordingly, the computer system can output a de-noised version of the initial image 134 generated using conventional MR image processing techniques.

Medical Imaging System Architecture

Figure 5A:
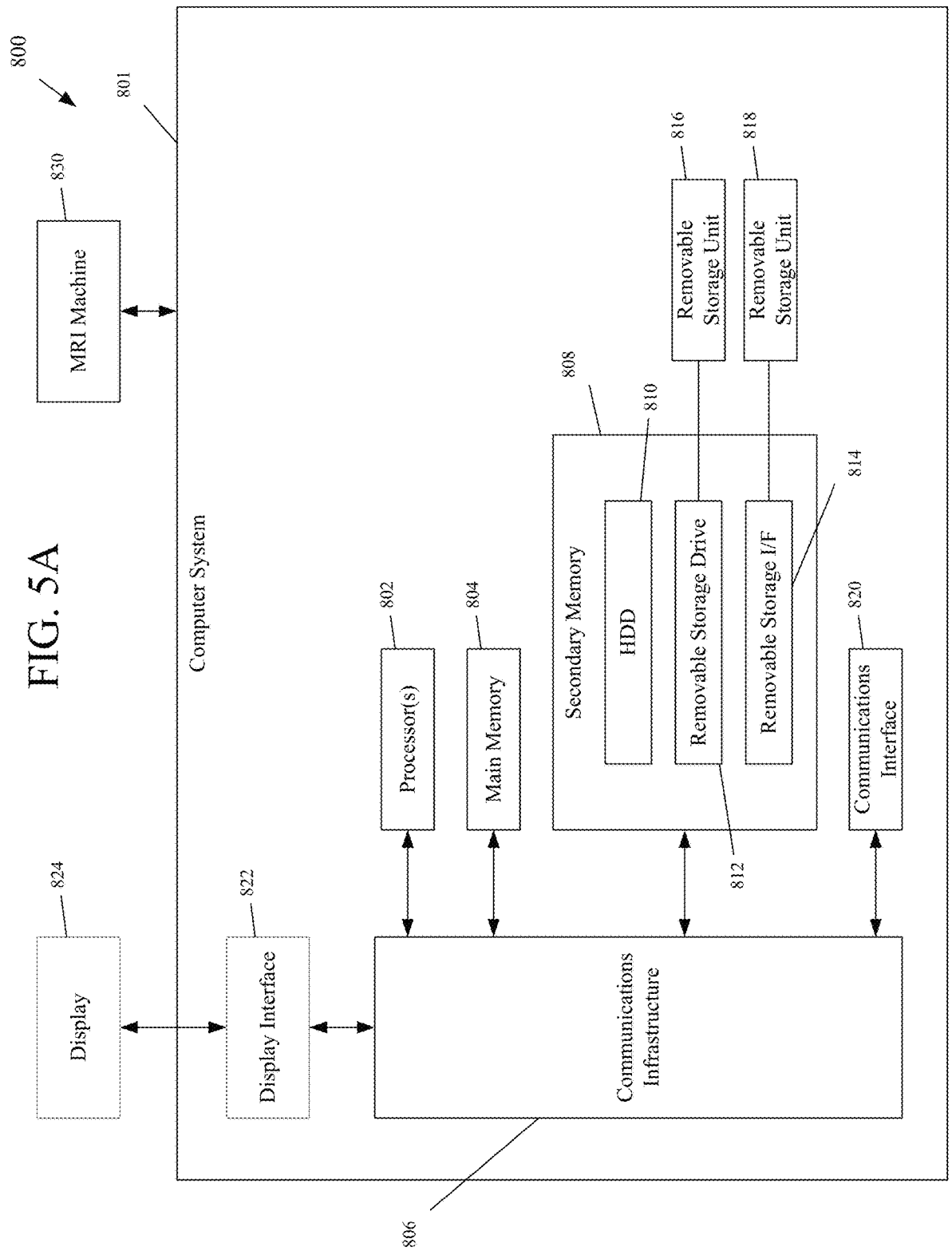
FIG. 5A is a block diagram of a medical imaging system, in accordance with at least one aspect of the present disclosure.
Figure 5B:
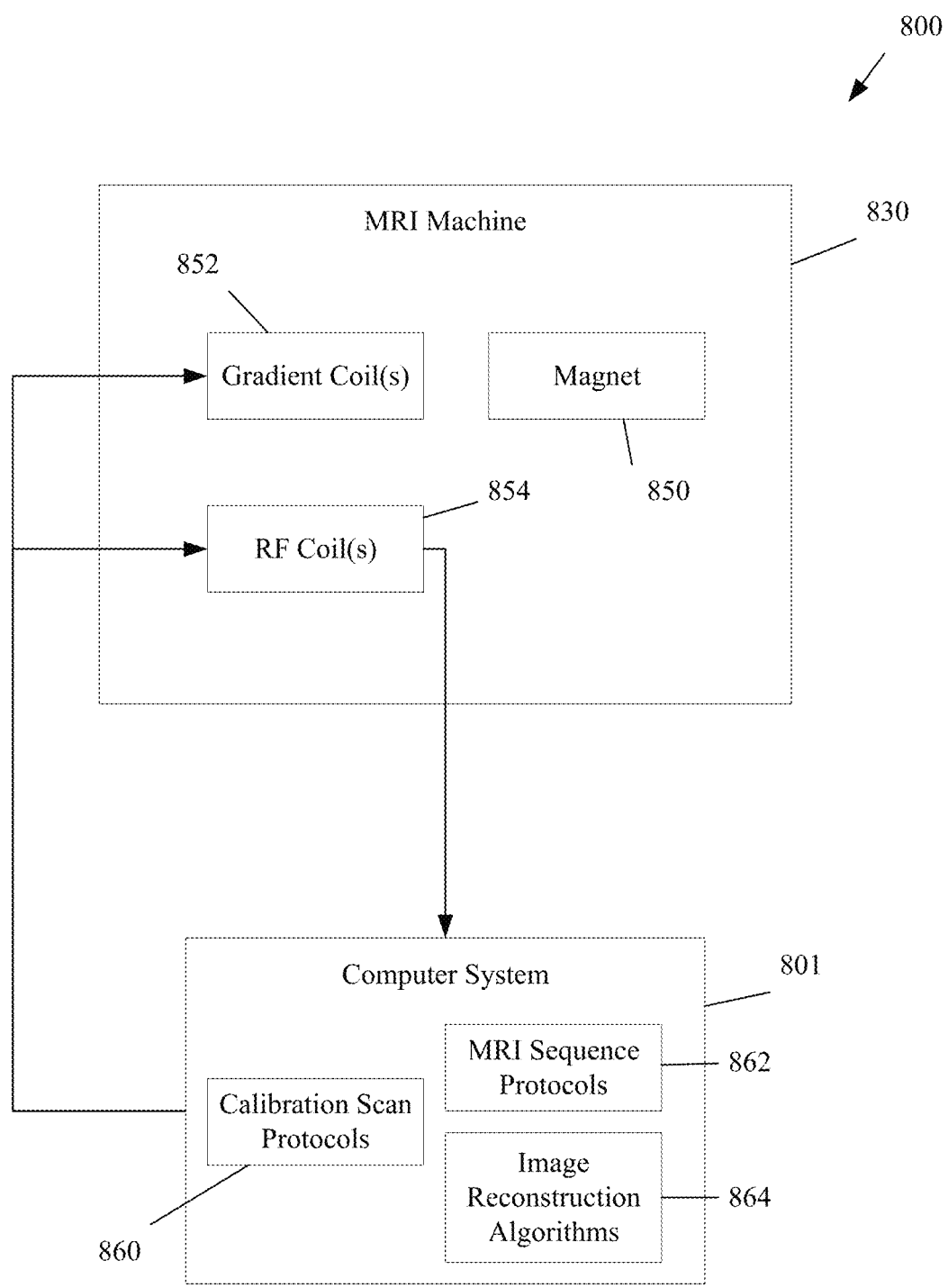
FIG. 5B is a second block diagram of the medical imaging system shown in FIG. 5A, in accordance with at least one aspect of the present disclosure.

In some embodiments, the systems and techniques described above can be implemented in or by a medical imaging system, such as the medical imaging system 800 illustrated in FIGS. 5A and 5B.

FIG. 5A is an architecture diagram of medical imaging system 800 that may be used in some embodiments. As noted above, the medical imaging system 800 can include a computer system 801 and an imaging machine 830 (e.g., an MRI machine). The computer system 801 may include one or more processors 802. Each processor 802 is connected to a communication infrastructure 806 (e.g., a communications bus, cross-over bar, or network). The processor(s) 802 can include a CPU, a GPU, an AI accelerator, and/or a variety of other processor types. Computer system 801 may include a display interface 822 that forwards graphics, text, and other data from the communication infrastructure 806 (or from a frame buffer, not shown) for display on the display unit 824.

Computer system 801 may also include a main memory 804, such as a random-access memory (RAM), and a secondary memory 808. The secondary memory 808 may include, for example, a hard disk drive (HDD) 810 and/or removable storage drive 812, which may represent a floppy disk drive, a magnetic tape drive, an optical disk drive, a memory stick, or the like as is known in the art. The removable storage drive 812 reads from and/or writes to a removable storage unit 816. Removable storage unit 816 may be a floppy disk, magnetic tape, optical disk, or the like. As will be understood, the removable storage unit 816 may include a computer readable storage medium having tangibly stored therein (embodied thereon) data and/or computer software instructions, e.g., for causing the processor(s) to perform various operations.

In alternative embodiments, secondary memory 808 may include other similar devices for allowing computer programs or other instructions to be loaded into computer system 801. Secondary memory 808 may include a removable storage unit 818 and a corresponding removable storage interface 814, which may be similar to removable storage drive 812, with its own removable storage unit 816. Examples of such removable storage units include, but are not limited to, USB or flash drives, which allow software and data to be transferred from the removable storage unit 816, 818 to computer system 801.

Computer system 801 may also include a communications interface 820. Communications interface 820 allows software and data to be transferred between computer system 801 and external devices. Examples of communications interface 820 may include a modem, Ethernet card, wireless network card, a Personal Computer Memory Card International Association (PCMCIA) slot and card, or the like. Software and data transferred via communications interface 820 may be in the form of signals, which may be electronic, electromagnetic, optical, or the like that are capable of being received by communications interface 820. These signals may be provided to communications interface 820 via a communications path (e.g., channel), which may be implemented using wire, cable, fiber optics, a telephone line, a cellular link, a radio frequency (RF) link and other communication channels.

In this document, the terms "computer program medium" and "non-transitory computer-readable storage medium" refer to media such as, but not limited to, media at removable storage drive 812, a hard disk installed in hard disk drive 810, or removable storage unit 816. These computer program products provide software to computer system 801. Computer programs (also referred to as computer control logic) may be stored in main memory 804 and/or secondary memory 808. Computer programs may also be received via communications interface 820. Such computer programs, when executed by a processor, enable the computer system 801 to perform the features of the methods discussed herein. For example, main memory 804, secondary memory 808, or removable storage units 816 or 818 may be encoded with computer program code (instructions) for performing operations corresponding to various processes disclosed herein.

Referring now to FIG. 5B, an exemplary MRI machine 830 can include a magnet 850 (e.g., extending along a bore) that is configured to receive a patient therein and that is configured to produce a generally uniform magnetic field, one or more gradient coils 852 that are configured to produce magnetic field gradients (e.g., linear gradients), and one or more RF coils 854 that are configured to transmit to RF signals to the patient's body and/or receive RF signals therefrom. The computer system 801 (embodiments of which are described in greater detail above) can store and implement calibration scan protocols 860, MRI sequences protocols 862, and/or image reconstruction algorithms 864, as well as a variety of other software modules known in the technical field. The MRI sequence protocols 862 can be embodied as instructions that, when executed by the computer system 801, cause the computer system 801 to control the gradient coils 852 and/or RF coils 854 to apply a particular sequence of magnetic field gradients and/or RF pulses to the patient. The image reconstruction algorithms 864 can be embodied as instructions that, when executed by the computer system 801, cause the computer system 801 to reconstruct an image of the patient based on the RF signal received from the patient (e.g., by the RF coils 854) as caused by the MRI sequence applied thereto. The image reconstruction algorithms 864 could include the processes 100, 200 or any of the other techniques described above. The calibration scan protocols 860 can likewise be embodied as instructions that, when executed by the computer system 801, cause the computer system 801 to apply particular MRI sequences and/or imaging trajectories (e.g., Cartesian or non-Cartesian trajectories) to calibrate the MRI machine 830 for imaging acquisition and/or parameter mapping applications.

It is understood by those familiar with the art that the system described herein may be implemented in hardware, firmware, or software encoded (e.g., as instructions executable by a processor) on a non-transitory computer-readable storage medium.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A computer-implemented method for improving images captured via magnetic resonance imaging (MRI), the method comprising:
   receiving, by a computer system, MRI data from an MRI machine, the MRI data comprising image data;
   calculating, by the computer system, a noise level associated with the MRI data;
   selecting, by the computer system, a regularization parameter corresponding to the calculated noise level;
   processing, by the computer system, the image data through a first reconstruction pipeline to output a first reconstructed image;
   processing, by the computer system, the image data through a second reconstruction pipeline to output a second reconstructed image, wherein the second reconstruction pipeline comprises a neural network; and
   reconstructing, by the computer system, a hybrid image from the first reconstructed image and the second reconstructed image, wherein an amount that the second reconstructed image contributes to the hybrid image corresponds to the selected regularization parameter, wherein the regularization parameter is selected to cause the hybrid image to be de-noised relative to the image data,
   wherein the hybrid image is reconstructed from a weighted combination of the first reconstructed image and the second reconstructed image and the reconstructing the hybrid image includes calculating, by the computer system, the hybrid image based on a measured k-space vector, a k-space sampling, a Fourier transform, a coil sensitivity corresponding to the MRI machine, a weighting matrix, the second reconstructed image, the image data, and the selected regularization parameter.

2. The computer-implement method of claim 1, wherein the first reconstruction pipeline comprises a sensitivity encoded (SENSE) reconstruction.

3. The computer-implemented method of claim 1, wherein selecting the regularization parameter comprises:
   querying, by the computer system, a database comprising a plurality of regularization parameters indexed to a plurality of noise levels; and
   selecting, by the computer system, the regularization parameter from the plurality of regularization parameters that corresponds to the calculated noise level.

4. The computer-implemented method of claim 1, wherein selecting the regularization parameter comprises:

calculating, by the computer system, the regularization parameter from a fitted parametric model relating the calculated noise level to the regularization parameter.

5. The computer-implement method of claim 1, wherein selecting the regularization parameter is subject to user-customized preferences.

6. The computer-implement method of claim 1, wherein reconstructing the hybrid image comprises
calculating, by the computer system, the hybrid image according to:

$$\hat{\rho} = \underset{\rho}{\operatorname{argmin}} \|d - \Omega F C \rho\|_2^2 + \lambda \|WFC(\rho_{net} - \rho)\|_2^2$$

wherein $\hat{\rho}$ is the hybrid image, d is the measured k-space data vector, $\Omega$ is the k-space sampling, F is the Fourier transform, C is the coil sensitivity corresponding to the MRI machine, W is the weighting matrix, $\rho_{net}$ is the second reconstructed image, $\rho$ is the image data, and $\lambda$ is the selected regularization parameter.

7. The computer-implement method of claim 1, wherein the selected regularization parameter is varied spatially in the hybrid image.

8. The computer-implement method of claim 1, wherein the neural network comprises a deep neural network.

9. The computer-implement method of claim 1, wherein the neural network comprises a physics-informed network.

10. The computer-implemented method of claim 1, wherein:
the MRI data further comprises pre-scan data acquired without any generated MR signals; and
the noise level is calculated from the pre-scan data.

11. The computer-implemented method of claim 1, wherein the noise level comprises a signal-to-noise ratio.

12. A magnetic resonance imaging (MRI) system for capturing images, the system comprising:
an MRI machine; and
a computer system coupled to the MRI machine, the computer system comprising a processor and a memory, the memory storing instructions that, when executed by the processor, cause the computer system to:
receive MRI data from the MRI machine, the MRI data comprising image data;
calculate a noise level associated with the MRI data;
select a regularization parameter corresponding to the calculated noise level;
process the image data through a first reconstruction pipeline to output a first reconstructed image;
process the image data through a second reconstruction pipeline to output a second reconstructed image, wherein the second reconstruction pipeline comprises a neural network; and
reconstruct a hybrid image from the first reconstructed image and the second reconstructed image, wherein an amount that the second reconstructed image contributes to the hybrid image corresponds to the selected regularization parameter, wherein the regularization parameter is selected to cause the hybrid image to be de-noised relative to the image data,
wherein the hybrid image is reconstructed from a weighted combination of the first reconstructed image and the second reconstructed image and the reconstructing the hybrid image includes calculating, by the computer system, the hybrid image based on a measured k-space vector, a k-space sampling, a Fourier transform, a coil sensitivity corresponding to the MRI machine, a weighting matrix, the second reconstructed image, the image data, and the selected regularization parameter.

13. The MRI system of claim 12, wherein the first reconstruction pipeline comprises a sensitivity encoded (SENSE) reconstruction.

14. The MRI system of claim 12, wherein the memory stores instructions that, when executed by the processor, cause the computer system to select the regularization parameter by:
querying a database comprising a plurality of regularization parameters indexed to a plurality of noise levels; and
selecting the regularization parameter from the plurality of regularization parameters that corresponds to the calculated noise level.

15. The MRI system of claim 12, wherein the memory stores instructions that, when executed by the processor, cause the computer system to select the regularization parameter by:
calculating, by the computer system, the regularization parameter from a fitted parametric model relating the calculated noise level to the regularization parameter.

16. The MRI system of claim 12, wherein the memory stores instructions that, when executed by the processor, cause the computer system to select the regularization parameter subject to user-customized preferences.

17. The MRI system of claim 12, wherein reconstructing the hybrid image comprises
calculating, by the computer system, the hybrid image according to:

$$\hat{\rho} = \underset{\rho}{\operatorname{argmin}} \|d - \Omega F C \rho\|_2^2 + \lambda \|WFC(\rho_{net} - \rho)\|_2^2$$

wherein $\hat{\rho}$ is the hybrid image, d is the measured k-space data vector, $\Omega$ is the k-space sampling, F is the Fourier transform, C is the coil sensitivity corresponding to the MRI machine, W is the weighting matrix, $\rho_{net}$ is the second reconstructed image, $\rho$ is the image data, and $\lambda$ is the selected regularization parameter.

18. The MRI system of claim 12, wherein the selected regularization parameter is varied spatially in the hybrid image.

19. The MRI system of claim 12, wherein the neural network comprises a deep neural network.

20. The MRI system of claim 12, wherein the neural network comprises a physics-informed network.

21. The MRI system of claim 12, wherein:
the MRI data further comprises pre-scan data acquired without any generated MR signals; and
the noise level is calculated from the pre-scan data.

22. The MRI system of claim 12, wherein the noise level comprises a signal-to-noise ratio.

* * * * *